(12) United States Patent
Jain et al.

(10) Patent No.: US 11,177,978 B2
(45) Date of Patent: Nov. 16, 2021

(54) CONNECTING VIRTUAL COMPUTER NETWORKS WITH OVERLAPPING IP ADDRESSES USING TRANSIT VIRTUAL COMPUTER NETWORK

(71) Applicant: VMware, Inc., Palo Alto, CA (US)

(72) Inventors: Rahul Jain, Milpitas, CA (US); Mukesh Hira, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 61 days.

(21) Appl. No.: 16/525,426

(22) Filed: Jul. 29, 2019

(65) Prior Publication Data

US 2021/0036889 A1 Feb. 4, 2021

(51) Int. Cl.
*H04L 12/46* (2006.01)
*H04L 12/713* (2013.01)
*H04L 29/12* (2006.01)
*H04L 12/715* (2013.01)

(52) U.S. Cl.
CPC ........ *H04L 12/4641* (2013.01); *H04L 45/586* (2013.01); *H04L 45/64* (2013.01); *H04L 61/2061* (2013.01); *H04L 61/2535* (2013.01)

(58) Field of Classification Search
CPC .................................................. H04L 12/4641
See application file for complete search history.

(56) References Cited

U.S. PATENT DOCUMENTS

| | | | |
|---|---|---|---|
| 8,725,898 B1* | 5/2014 | Vincent ............... | H04L 61/2517 709/245 |
| 10,057,157 B2* | 8/2018 | Goliya ................. | H04L 45/586 |
| 10,084,726 B2 | 9/2018 | Zhang et al. | |
| 10,382,401 B1* | 8/2019 | Lee ......................... | H04L 67/10 |
| 2014/0052877 A1* | 2/2014 | Mao ..................... | H04L 12/4641 709/245 |
| 2015/0052525 A1* | 2/2015 | Raghu .................... | H04L 67/10 718/1 |
| 2015/0324215 A1* | 11/2015 | Borthakur ........... | H04L 43/0876 718/1 |
| 2016/0234161 A1* | 8/2016 | Banerjee ................. | H04L 67/10 |
| 2017/0005923 A1* | 1/2017 | Babakian ............ | G06F 9/45558 |
| 2017/0063632 A1* | 3/2017 | Goliya ................. | H04L 45/586 |
| 2019/0036868 A1* | 1/2019 | Chandrashekhar ..... | H04L 45/64 |
| 2019/0081930 A1* | 3/2019 | Hunt, IV ............... | H04L 63/06 |
| 2019/0245949 A1* | 8/2019 | Wang .................... | H04L 69/22 |

(Continued)

*Primary Examiner* — Jae Y Lee
*Assistant Examiner* — Andrew C Lee
(74) *Attorney, Agent, or Firm* — Loza & Loza, LLP

(57) ABSTRACT

A system and method for connecting virtual computer networks in a public cloud computing environment using a transit virtual computer network uses a cloud gateway device in the transit virtual computer network that includes a first-tier logical router and a plurality of second-tier logical routers connected to the virtual computer networks. A source Internet Protocol (IP) address of outgoing data packets from a particular virtual computer network is translated at a particular second-tier logical router of the cloud gateway device from an IP address of the particular virtual computer network to an internal IP address from a particular pool of IP addresses. The outgoing data packets are then routed to the first-tier logical router of the cloud gateway device, where the outgoing data packets are transmitted a destination network from a particular interface of the first-tier logical router of the cloud gateway device.

20 Claims, 10 Drawing Sheets

(56) References Cited

U.S. PATENT DOCUMENTS

| | | | |
|---|---|---|---|
| 2020/0007495 A1* | 1/2020 | Balamurugan | H04L 45/64 |
| 2020/0073692 A1* | 3/2020 | Rao | G06F 9/45558 |
| 2020/0195607 A1* | 6/2020 | Wang | H04L 63/20 |
| 2020/0236046 A1* | 7/2020 | Jain | G06F 9/45558 |

* cited by examiner

CONNECTING VIRTUAL COMPUTER NETWORKS WITH OVERLAPPING IP ADDRESSES USING TRANSIT VIRTUAL COMPUTER NETWORK

BACKGROUND

Classless Inter-Domain Routing (CIDR) is widely used in virtual private clouds (VPCs) and virtual networks (VNETs) due to its flexibility with respect to allocation of Internet Protocol (IP) addresses. Typically, a transit VPC/VNET is used to connect multiple VPCs and/or VNETs. A transit VPC/VNET can operate as a hub for all traffic passing between the different VPCs and/or VNETs.

However, connecting overlapping CIDR block VPCs and/or VNETs via a transit VPC/VNET is a common problem in a public cloud. Cloud providers do not support peering overlapping CIDR block VPCs and/or VNETs. Since two companies can have overlapping CIDR IP addresses in different VPCs and/or VNET, which may exist across clouds or in on-prem, connecting the overlapping CIDR block VPCs and/or VNET via a transit VPC/VNET for on-prem or Internet access due to an Internet Technology (IT) acquisition is a significant challenge.

An existing solution for connecting overlapping CIDR block VPCs and/or VNET involves creating a new overlay logical topology in the public cloud. This solution requires reconfiguring the overlay logical IP address on each workload virtual machine (VM) for all VPCs/VNETs, which means that existing applications and load balancers must be reconfigured with the new overlay logical IP addresses.

SUMMARY

A system and method for connecting virtual computer networks in a public cloud computing environment using a transit virtual computer network uses a cloud gateway device in the transit virtual computer network that includes a first-tier logical router and a plurality of second-tier logical routers connected to the virtual computer networks. A source Internet Protocol (IP) address of outgoing data packets from a particular virtual computer network is translated at a particular second-tier logical router of the cloud gateway device from an IP address of the particular virtual computer network to an internal IP address from a particular pool of IP addresses. The outgoing data packets are then routed to the first-tier logical router of the cloud gateway device, where the outgoing data packets are transmitted a destination network from a particular interface of the first-tier logical router of the cloud gateway device.

A computer-implemented method for connecting virtual computer networks in a public cloud computing environment using a transit virtual computer network in accordance with an embodiment of the invention comprises receiving outgoing data packets at a particular second-tier logical router of a cloud gateway device in the transit virtual computer network from a particular virtual computer network of the virtual computer networks, the particular second-tier logical router being a second-tier logical router from a plurality of second-tier logical routers in the cloud gateway device that is exclusively connected to the particular virtual computer network, translating a source IP address of the outgoing data packets at the second-tier logical router of the cloud gateway device from an IP address of the particular virtual computer network to an internal IP address from a particular pool of IP addresses assigned to the particular virtual computer network, the particular pool of IP addresses being a pool of IP addresses from a plurality of pools of IP addresses used in the cloud gateway device that is exclusively assigned to the particular virtual computer network, routing the outgoing data packets from the second-tier logical router of the cloud gateway device to a first-tier logical router of the cloud gateway device, including routing the outgoing data packets to a particular interface of the first-tier logical router that corresponds to a destination network for the outgoing data packets, and transmitting the outgoing data packets from the particular interface of the first-tier logical router of the cloud gateway device to the destination network. In some embodiments, the steps of this method are performed when program instructions contained in a non-transitory computer-readable storage medium are executed by one or more processors.

A system in accordance with an embodiment of the invention comprises memory and at least one processor configured to receive outgoing data packets at a particular second-tier logical router of a cloud gateway device in a transit virtual computer network from a particular virtual computer network of virtual computer networks connected to the transit virtual computer network in a public cloud computing environment, the particular second-tier logical router being a second-tier logical router from a plurality of second-tier logical routers in the cloud gateway device that is exclusively connected to the particular virtual computer network, translate a source IP address of the outgoing data packets at the second-tier logical router of the cloud gateway device from an IP address of the particular virtual computer network to an internal IP address from a particular pool of IP addresses assigned to the particular virtual computer network, the particular pool of IP addresses being a pool of IP addresses from a plurality of pools of IP addresses used in the cloud gateway device that is exclusively assigned to the particular virtual computer network, route the outgoing data packets from the second-tier logical router of the cloud gateway device to a first-tier logical router of the cloud gateway device, including routing the outgoing data packets to a particular interface of the first-tier logical router that corresponds to a destination network for the outgoing data packets, and transmit the outgoing data packets from the first-tier logical router of the cloud gateway device to the destination network.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
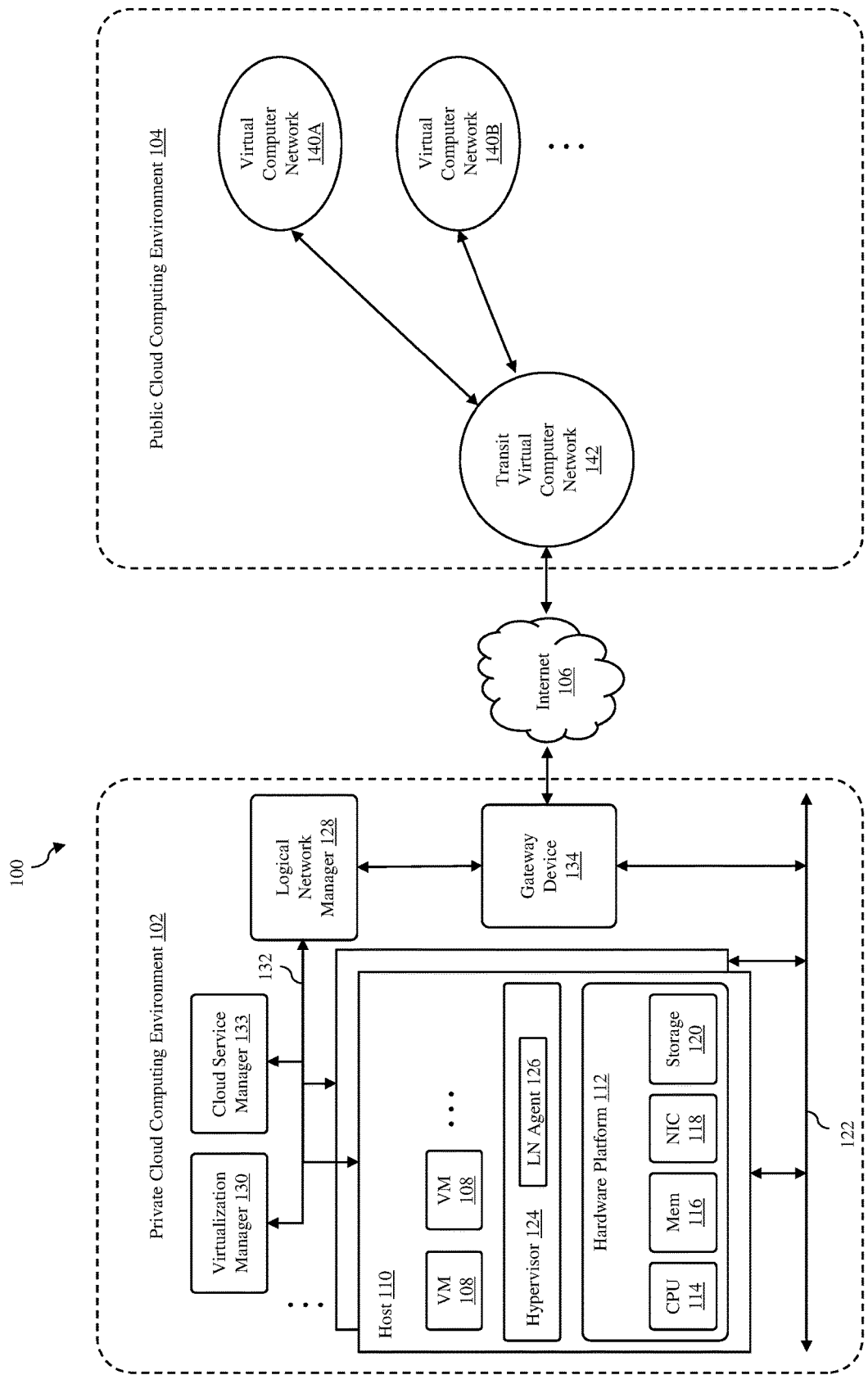
FIG. 1 is a block diagram of a distributed computer system in accordance with an embodiment of the invention.

Turning now to FIG. 1, a block diagram of a distributed computer system 100 in accordance with an embodiment of the invention is shown. The distributed computer system 100 includes at least one private cloud computing environment 102 and at least one public cloud computing environment 104 that are both connected to the Internet 106. The distributed computer system 100 is configured to provide a platform for managing and executing workloads seamlessly between the private and public cloud computing environments. In one embodiment, the private cloud computing environment 102 may be controlled and administrated by a particular enterprise or business organization, while the public cloud computing environment 104 may be operated by a cloud computing service provider and exposed as a service available to account holders, such as the particular enterprise in addition to other enterprises. In some embodiments, the private cloud computing environment 102 may be a private or on-premise data center (commonly referred to as an "on-prem").

The private and public cloud computing environments 102 and 104 of the distributed computer system 100 include computing and/or storage infrastructures to support a number of virtual computing instances 108. As used herein, the term "virtual computing instance" refers to any software processing entity that can run on a computer system, such as a software application, a software process, a virtual machine (VM), e.g., a VM supported by virtualization products of VMware, Inc., and a software "container", e.g., a Docker container. However, in this disclosure, the virtual computing instances will be described as being virtual machines, although embodiments of the invention described herein are not limited to virtual machines.

As shown in FIG. 1, the private cloud computing environment 102 of the distributed computer system 100 includes one or more host computer systems ("hosts") 110. The hosts may be constructed on a server grade hardware platform 112, such as an x86 architecture platform. As shown, the hardware platform of each host may include conventional components of a computing device, such as one or more processors (e.g., CPUs) 114, system memory 116, a network interface 118, storage system 120, and other I/O devices such as, for example, a mouse and a keyboard (not shown). The processor 114 is configured to execute instructions, for example, executable instructions that perform one or more operations described herein and may be stored in the memory 116 and the storage system 120. The memory 116 is volatile memory used for retrieving programs and processing data. The memory 116 may include, for example, one or more random access memory (RAM) modules. The network interface 118 enables the host 110 to communicate with another device via a communication medium, such as a network 122 within the private cloud computing environment. The network interface 118 may be one or more network adapters, also referred to as a Network Interface Card (NIC). The storage system 120 represents local storage devices (e.g., one or more hard disks, flash memory modules, solid state disks and optical disks) and/or a storage interface that enables the host to communicate with one or more network data storage systems. Example of a storage interface is a host bus adapter (HBA) that couples the host to one or more storage arrays, such as a storage area network (SAN) or a network-attached storage (NAS), as well as other network data storage systems. The storage system 120 is used to store information, such as executable instructions, cryptographic keys, virtual disks, configurations and other data, which can be retrieved by the host.

Each host 110 may be configured to provide a virtualization layer that abstracts processor, memory, storage and networking resources of the hardware platform 112 into the virtual computing instances, e.g., the virtual machines 108, that run concurrently on the same host. The virtual machines run on top of a software interface layer, which is referred to herein as a hypervisor 124, that enables sharing of the hardware resources of the host by the virtual machines. One example of the hypervisor 124 that may be used in an embodiment described herein is a VMware ESXi™ hypervisor provided as part of the VMware vSphere® solution made commercially available from VMware, Inc. The hypervisor 124 may run on top of the operating system of the host or directly on hardware components of the host. For other types of virtual computing instances, the host may include other virtualization software platforms to support those virtual computing instances, such as Docker virtualization platform to support software containers.

In the illustrated embodiment, the hypervisor 124 includes a logical network agent 126, which operates to provide logical networking capabilities, also referred to as "software defined networking" (SDN). Each logical network may include software managed and implemented network services, such as bridging, L3 routing, L2 switching, network address translation (NAT), and firewall capabilities, to support one or more logical overlay networks in the private cloud computing environment 102. The logical network agent 126 receives configuration information from a logical network manager 128 (which may include a control plane cluster) and, based on this information, populates forwarding, firewall and/or other action tables for dropping or directing packets between the virtual machines 108 in the host 110, and other virtual computing instances on other hosts, and/or the outside world via the Internet 106. Collectively, the logical network agent 126, together with other agents on other hosts, according to their forwarding/routing tables, implement isolated overlay networks that can connect arbitrarily selected virtual machines or other virtual computing instances with each other. Each virtual machine or virtual computing instance may be arbitrarily assigned a particular logical network in a manner that decouples the overlay network topology from the underlying physical network. Generally, this is achieved by encapsulating packets at a source host and decapsulating packets at a destination host so that virtual machines on the source and destination can communicate without regard to underlying physical network topology. In a particular implementation, the logical network agent 126 may include a Virtual Extensible Local Area Network (VXLAN) Tunnel End Point or VTEP that operates to execute operations with respect to encapsulation and decapsulation of packets to support a VXLAN backed overlay network. In alternate implementations, VTEPs support other tunneling protocols such as stateless transport tunneling (STT), Network Virtualization using Generic Routing Encapsulation (NVGRE), or Geneve, instead of, or in addition to, VXLAN.

The private cloud computing environment 102 also includes a virtualization manager 130 that communicates with the hosts 110 via a management network 132. In an embodiment, the virtualization manager 130 is a computer program that resides and executes in a computer system, such as one of the hosts, or in a virtual computing instance, such as one of the virtual machines 108 running on the hosts. One example of the virtualization manager 130 is the VMware vCenter Server® product made available from VMware, Inc. The virtualization manager is configured to carry out administrative tasks for the private cloud computing environment, including managing the hosts, managing the virtual machines running within each host, provisioning virtual machines, migrating virtual machines from one host to another host, and load balancing between the hosts. In an embodiment, the private cloud computing environment 102 also includes a cloud service manager 133, which may be connected to the management network 132. The cloud service manager 133 can provide a single pane of glass management endpoint for various public cloud constructs. The cloud service manager 133 may be a virtual appliance that provides a graphic user interface (CGI) and REST APIs for onboarding, configuring and monitoring public cloud inventory, in particular, a cloud gateway device running in the public cloud computing environment 104, as described below.

As noted above, the private cloud computing environment 102 also includes the logical network manager 128 (which may include a control plane cluster), which operates with the logical manager agents 126 in the hosts 110 to manage and control logical overlay networks in the private cloud computing environment 102. Logical overlay networks comprise logical network devices and connections that are mapped to physical networking resources, e.g., switches and routers, in a manner analogous to the manner in which other physical resources as compute and storage are virtualized. In an embodiment, the logical network manager has access to information regarding physical components and logical overlay network components in the private cloud computing environment 102. With the physical and logical overlay network information, the logical network manager 128 is able to map logical network configurations to the physical network components that convey, route, and filter physical traffic in the private cloud computing environment. In one particular implementation, the logical network manager is a VMware NSX™ manager running on a physical computer in the private cloud computing environment.

The private cloud computing environment 102 also includes a gateway device 134, which may be implemented as a virtual appliance, to control network traffic to and from the Internet 106. The gateway device 134 is configured to provide the virtual machines 108 and other devices in the private cloud computing environment 102 with connectivity to external devices via the Internet 106. The gateway device 134 may manage external public Internet Protocol (IP) addresses for the virtual machines 108 and route traffic incoming to and outgoing from the private cloud computing environment and provide networking services, such as firewalls, network address translation (NAT), dynamic host configuration protocol (DHCP), load balancing, and virtual private network (VPN) connectivity over the Internet 106. In one particular implementation, the gateway device 134 is a VMware NSX™ Edge Gateway device.

The public cloud computing environment 104 of the distributed computer system 100 is configured to dynamically provide an enterprise (or users of an enterprise) with one or more virtual computer networks, such as virtual private clouds (VPCs) and virtual networks (VNETs) in which an administrator of the enterprise may provision virtual computing instances, e.g., virtual machines, and install and execute various applications in the virtual computing instances, as well as deploy any other software components directly in the virtual computer networks. The public cloud computing environment includes a physical infrastructure (not shown) upon which the virtual computer networks can operate.

As shown in FIG. 1, the public cloud computing environment 104 includes a number of virtual computer networks 140 (i.e., 140A, 140B . . . ), which may be VPCs or VNETs, that are connected to a transit virtual computer network 142, which may also be a VPC or VNET. Some of the virtual computer networks may employ overlapping CIDR IP address blocks, which would not be supported by a conventional transmit VPC/VNET in a public cloud environment. As explained below, the transit virtual computer network 142 provides a solution to connect any CIDR block virtual computer networks, even overlapping CIDR block virtual computer networks.

Figure 2:
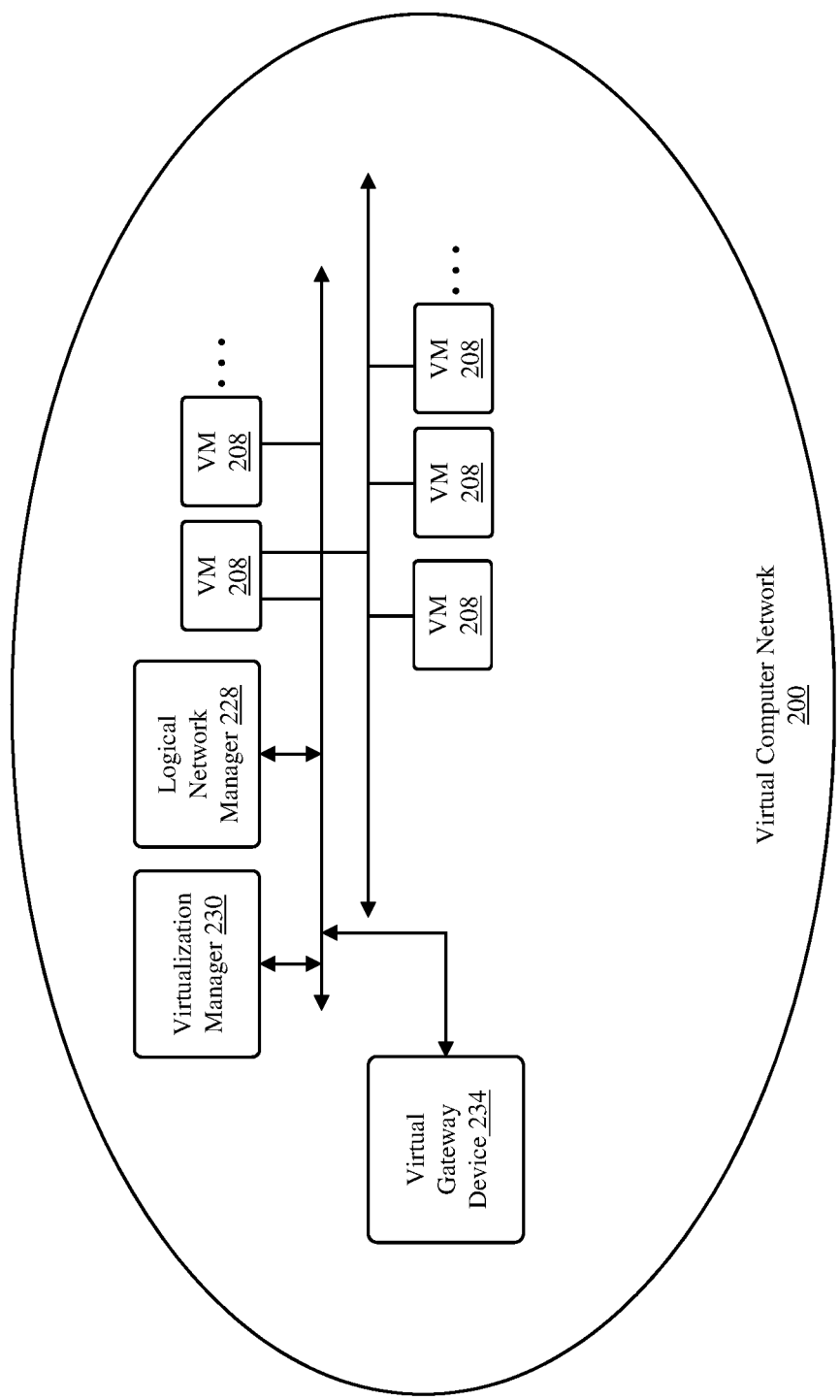
FIG. 2 shows a virtual computer network that is representative of virtual computer networks in a public cloud computing environment of the distributed computer system in accordance with an embodiment of the invention.

Each virtual computer network may include software components that are found in the private cloud computing environment 102 to create a similar computing environment as the private cloud computing environment. As an example, a virtual computer network 200 that is representative of the virtual computer networks 140 in the public cloud computing environment 104 is illustrated in FIG. 2. As shown in FIG. 2, the virtual computer network 200 includes a number of virtual computing instances 208 in the form of virtual machines, which can process workloads for a single tenant, which may be the same enterprise that own and operate the private cloud computing environment 102. These virtual machines 208 may be configured or programmed to be similar to the virtual machines 108 in the private cloud computing environment. Thus, each of these virtual machines may also include a logical network agent (not shown in FIG. 2). The virtual computer network 200 further includes a virtual gateway device 234, which controls traffic into and out of the virtual computer network. The virtual gateway device 234 may be a public cloud version of the gateway device 134 in the private cloud computing environment 102.

As shown in FIG. 2, the virtual computer network 200 further includes a logical network manager 228 and a virtualization manager 230. These components may have similar functionalities as the logical network manager 128 and the virtualization manager 130 in the private cloud computing environment 102, but designed to operate in a public cloud environment. In an embodiment, the logical network manager 228 and the virtualization manage 230 are public cloud versions of the logical network manager 128 and the virtualization manager 130.

Figure 3:
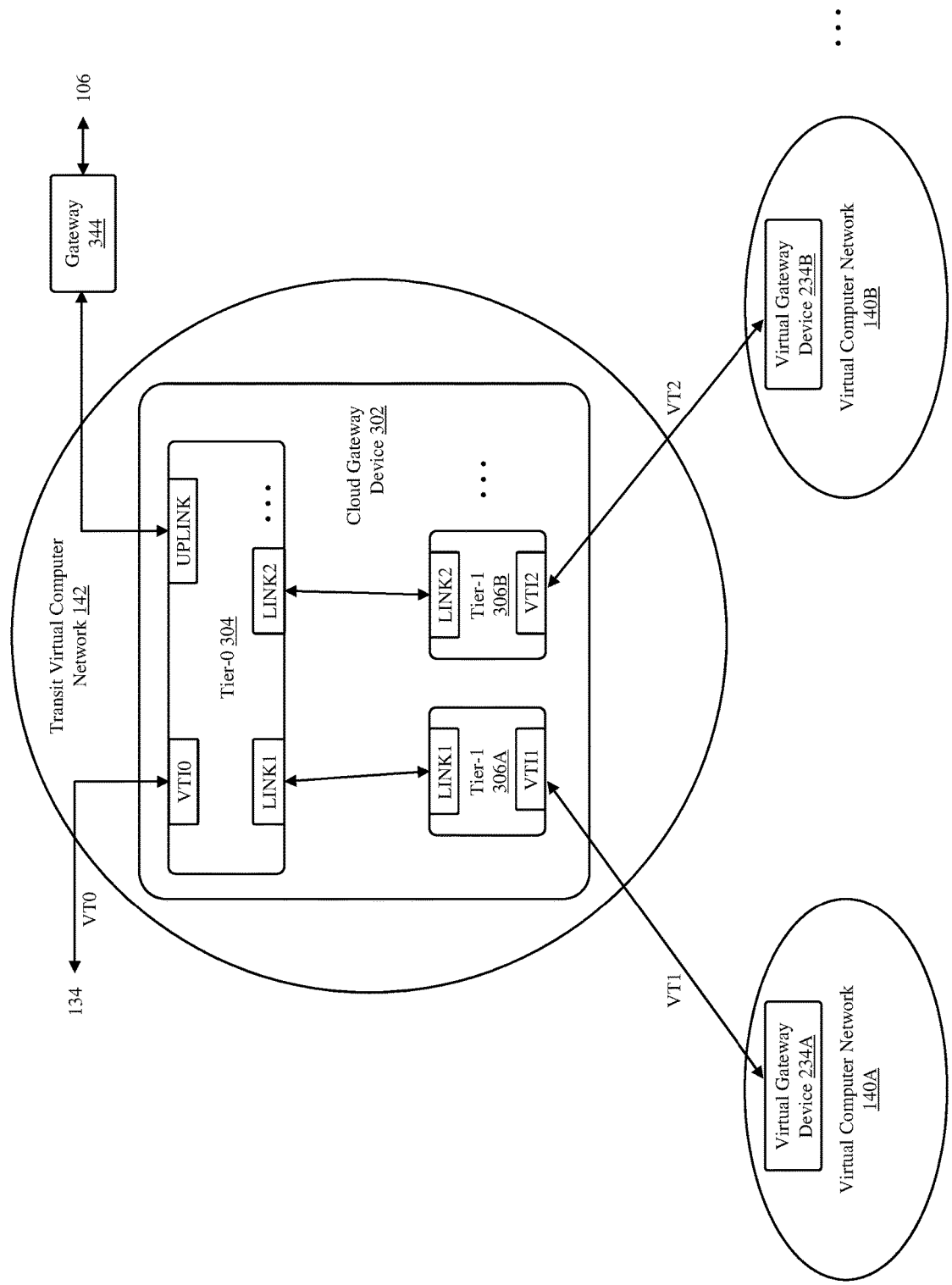
FIG. 3 illustrates a transit virtual computer network of the distributed computer network in accordance with an embodiment of the invention.

Turning now to FIG. 3, the transmit virtual computer network 142 in accordance with an embodiment of the invention is illustrated in detail. As shown in FIG. 3, the transmit virtual computer network includes a cloud gateway device 302, which functions as a communication hub for the virtual computer networks 140 so that the virtual computer networks can communicate with each other and with other networks, such as the private cloud computing environment 102 and the Internet 106. As shown in FIG. 3, the cloud gateway device 302 includes a tier-0 logical router 304 and a number of tier 1 logical routers 306 (i.e., 306A, 306B . . . ). The tier 0 logical router 304 is a top-tier router for the cloud gateway device 302 that includes northbound interfaces and southbound interfaces. The northbound interfaces of the tier-0 logical router 304 are used to interface with external networks, such as the private cloud computing environment 102 and the Internet 106. The southbound interfaces of the tier-0 logical router 304 are used to interface with the tier-1 logical routers 306 of the cloud gateway device 302.

As shown in FIG. 3, the northbound interfaces of the tier-0 logical router 304 include a VPN tunnel interface VTI0 and an uplink interface UPLINK. The VPN tunnel interface VTI0 of the tier-0 logical router 304 is used to connect to the private cloud computing environment 102 via an Internet Protocol Security (IPSEC) VPN tunnel VT0 created between the tier-0 logical router 304 and the gateway device 134 of the private cloud computing environment 102. The IPSEC VPN tunnel VT0 allows the virtual computer networks 140 to connect to the private cloud computing environment 102, which can be viewed as on-prem access for the virtual computer networks.

The uplink interface UPLINK of the tier-0 logical router 304 is used to connect to the Internet 106. In an embodiment, the uplink interface connects to an external gateway 344 in the public cloud computing environment 104, which is controlled by the cloud provider, to allow components in the public cloud computing environment, including the cloud gateway device 302, access to the Internet 106. The external gateway 344 may provide NAT between the IP addresses of the transit virtual computer network 142 and elastic/public IP addresses.

The southbound interfaces of the tier-0 logical router 304 include router link interfaces LINK (i.e., LINK1, LINK2 . . . ). Each of these router link interfaces is connected to a unique one of the tier-1 logical routers 306 of the cloud gateway device 302, which is connected to a particular virtual computer network of the virtual computer networks 140. Thus, the number of router link interfaces included in the cloud gateway device 302 is equal to the number of the virtual computer networks 140 connected to the cloud gateway device.

Each of the tier-1 logical routers 306 is a lower-tier router with respect to the tier-0 logical router 304 that connects a unique one of the virtual computer networks 140 to the tier-0 logical router. Each tier-1 logical router includes one northbound interface and one southbound interface. The northbound interface of each tier-1 logical router is a router link interface that connects to the corresponding router link interface of the tier-0 logical router 304. Thus, the tier-1 logical router 306A includes a router link interface LINK1 that connects to the corresponding router link interface LINK1 of the tier-0 logical router 304, the tier-1 logical router 306B includes a router link interface LINK2 that connects to the corresponding router link interface LINK2 of the tier-0 logical router 304, and so on. The southbound interface of each tier-1 logical router is a VPN tunnel interface that is used to connect to the respective virtual computer network 104 via an IPSEC VPN tunnel created between that tier-1 logical router and the virtual gateway device of the respective virtual computer network. Thus, the tier-1 logical router 306A includes an VPN tunnel interface VTI1 that connects to the virtual computer network 104A via an IPSEC VPN tunnel VT1 created between that tier-1 logical router 306A and a virtual gateway device 234A of the virtual computer network 140A, the tier-1 logical router 306B includes an VPN tunnel interface VTI2 that connects to the virtual computer network 104B via an IPSEC VPN tunnel VT2 created between that tier-1 logical router 306B and a virtual gateway device 234B of the virtual computer network 140B, and so on. Each of the tier-1 logical routers uses a static route between its northbound and southbound interfaces. In addition, each of the tier-1 logical routers can execute NAT operations, as explained below.

The tier-1 logical routers 306 are instantiated in the cloud gateway device 302 when the virtual computer networks 140 are connected to the transit virtual computer network 142. That is, a new tier-1 logical router is created in the cloud gateway device 302 when a new virtual computer network is connected to the cloud gateway device. In addition, a new CIDR pool of internal IP addresses is assigned to the new virtual computer network in the associated tier-1 logical router so that the IP addresses used in the new virtual computer network are translated to and from the internal IP addresses in the new IP address pool as needed for data traffic to and from the new virtual computer network, as explained below. The NAT performed in the new tier-1 logical router may be 1:1 (one component, such as a virtual machine, in the new virtual computer network to one internal pool IP address) or N:1 (many components in the new virtual computer network to one internal pool IP address). Additionally, a static route is added in the new tier-1 logical router so data are routed between its VPN tunnel interface and router link interface.

Figure 4:
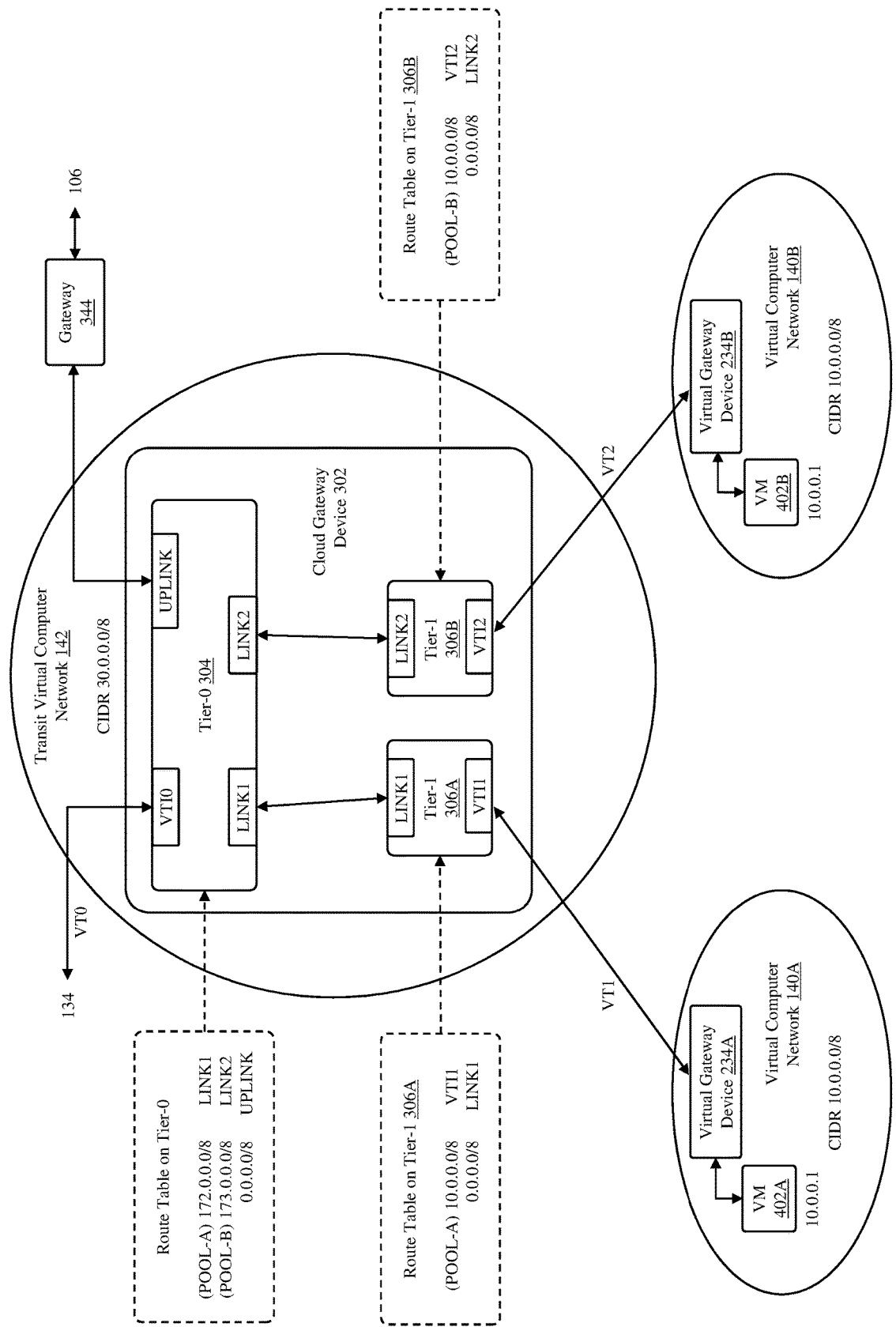
FIG. 4 illustrates an example of virtual computer networks with overlapping Classless Inter-Domain Routing (CIDR) Internet Protocol (IP) addresses that are connected to the transit virtual computer network in accordance with an embodiment of the invention

Turning now to FIG. 4, an example of virtual computer networks with overlapping CIDR IP addresses that are connected to the transit virtual computer network 140 in accordance with an embodiment of the invention. This example will be used to describe the data traffic from and to the virtual computer networks 140 that are connected to the transit virtual computer network 142, even when some of the virtual computer networks 140 have overlapping CIDR IP addresses. In this example, the virtual computer networks 140A and 140B both employ a CIDR IP address block of 10.0.0.0/8. Thus, these virtual computer networks 140A and 140B use overlapping CIDR IP addresses. The transit virtual computer network employs a CIDR IP address block of 30.0.0.0/8.

In FIG. 4, the cloud gateway device 302 is shown with only two tier-1 logical routers 306A and 306B for each of the two virtual computer networks 140A and 140B, respectively. The tier-1 logical router 306A includes the VPN tunnel interface VTI1, which provides connection to the virtual gateway device 234A of the virtual computer network 140A via the IPSEC VPN tunnel VT1, and the router link interface LINK1, which provides connection to the tier-0 logical router 304 of the cloud gateway device 302. Similarly, the tier-1 logical router 306B includes the VPN tunnel interface VT2, which provides connection to the virtual gateway device 234B of the virtual computer network 140B via the IPSEC VPN tunnel VT2, and the router link interface LINK2, which provides connection to the tier-0 logical router 304 of the cloud gateway device 302.

In this example, the virtual computer network 140A is assigned an internal IP pool POOLA of 172.0.0.0/8 and the virtual computer network 140B is assigned an internal IP pool POOLB of 173.0.0.0/8. Thus, the tier-1 logical router 306A in the cloud gateway device 302 for the virtual computer network 140A has a route table that includes "(POOLA) 10.0.0.0/8 VTI1" and "0.0.0.0/0 LINK1". Similarly, the tier-1 logical router 306B in the cloud gateway device 302 for the virtual computer network 140B has a route table that includes "(POOLB) 10.0.0.0/8 VTI1" and "0.0.0.0/0 LINK1". The tier-0 logical router 304 in the cloud gateway device 302 has a route table that includes "(POOLA) 172.0.0.0/8 LINK1", "(POOLB) 173.0.0.0/8 LINK1" and "0.0.0.0/0 Uplink".

Figure 5:
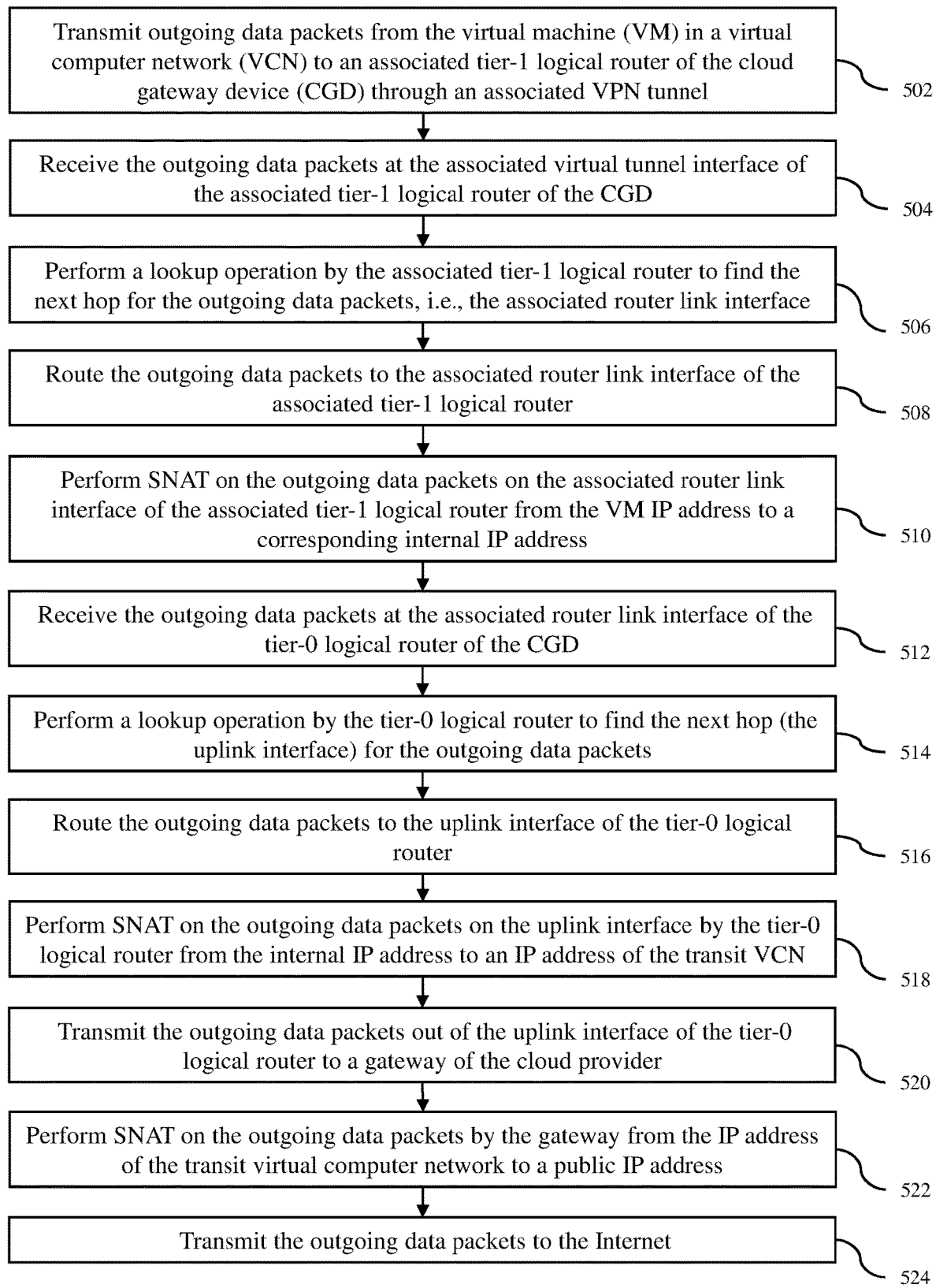
FIG. 5 is a process flow diagram of data traffic from any component in any of the virtual computer networks to the Internet using the transit virtual computer network in accordance with an embodiment of the invention.

The data traffic from any component in any of the virtual computer networks 140 to the Internet 106 using the transit virtual computer network 142 in accordance with an embodiment of the invention is described with references to a process flow diagram of FIG. 5 using the example shown in FIG. 4. In this description, it is assumed that the data traffic is from a virtual machine 402A with an IP address of 10.0.0.1 in the virtual computer network 140A.

At block 502, outgoing data packets from the virtual machine 402A in the virtual computer network 140A are transmitted to the associated tier-1 logical router 306A of the cloud gateway device 302 through the associated VPN tunnel VT1, which was specifically created for the virtual computer network 140A. As used herein, the term "associated" element means that the element corresponds to a particular virtual computer network. In order for the outgoing data packets to travel through the VPN tunnel VT1, the outgoing data packets are encapsulated into encrypted data packets.

Next, at block 504, the encapsulated data packets are received at the associated virtual tunnel interface VTI1 of the associated tier-1 logical router 306A of the cloud gateway device 302, where the encapsulate data packets are decapsulated back to the original outgoing data packets. Next, at block 506, a lookup operation is performed by the associated tier-1 logical router 306A to find the next hop for the outgoing data packets. In the example shown in FIG. 4, the next hop is the router link interface LINK1 of the tier-1 logical router 306A, as illustrated in the routing table on the tier-1 logical router 306A.

Next, at block 508, the outgoing data packets are routed to the associated router link interface LINK1 of the associated tier-1 logical router 306A because the default route points to the router link interface LINK1. Next, at block 510, source network address translation (SNAT) is performed on the outgoing data packets on the associated router link interface LINK1 of the associated tier-1 logical router 306A from the IP address of the virtual machine 402 to a corresponding internal IP address selected from the associated internal IP pool POOL-A. In the example shown in FIG. 4, the source IP address is translated from the virtual machine IP address of 10.0.0.1 to the internal POOL-A IP address of 172.0.0.1.

Next, at block 512, the outgoing data packets are received at the associated router link interface LINK1 of the tier-0 logical router 304 of the cloud gateway device 302. Next, at block 514, a lookup operation is performed by the tier-0 logical router to find the next hop for the outgoing data packets, which in this case is the uplink interface UPLINK since the outgoing data packets are destined for the Internet.

Next, at block 516, the outgoing data packets are routed to the uplink interface UPLINK of the tier-0 logical router 304. Next, at block 518, SNAT is performed on the outgoing data packets on the selected northbound interface by the tier-0 logical router 304 from the internal IP address to an IP address of the transit virtual computer network 142. In the example shown in FIG. 4, the source IP address is translated from the internal POOL-A IP address of 172.0.0.1 to the IP address of 30.0.0.1 of the transit virtual computer network 142.

Next, at block 520, the outgoing data packets are transmitted out of the uplink interface UPLINK of the tier-0 logical router 304 to the external gateway 344 of the cloud provider of the public cloud computing environment 104. Next, at block 522, SNAT is performed on the outgoing data packets by the external gateway 344 from the IP address of the transit virtual computer network 142 to an elastic/public IP address. Next, at block 522, the outgoing data packets are transmitted from the external gateway 344 to the Internet 106 to be routed to the final destination.

Figure 6:
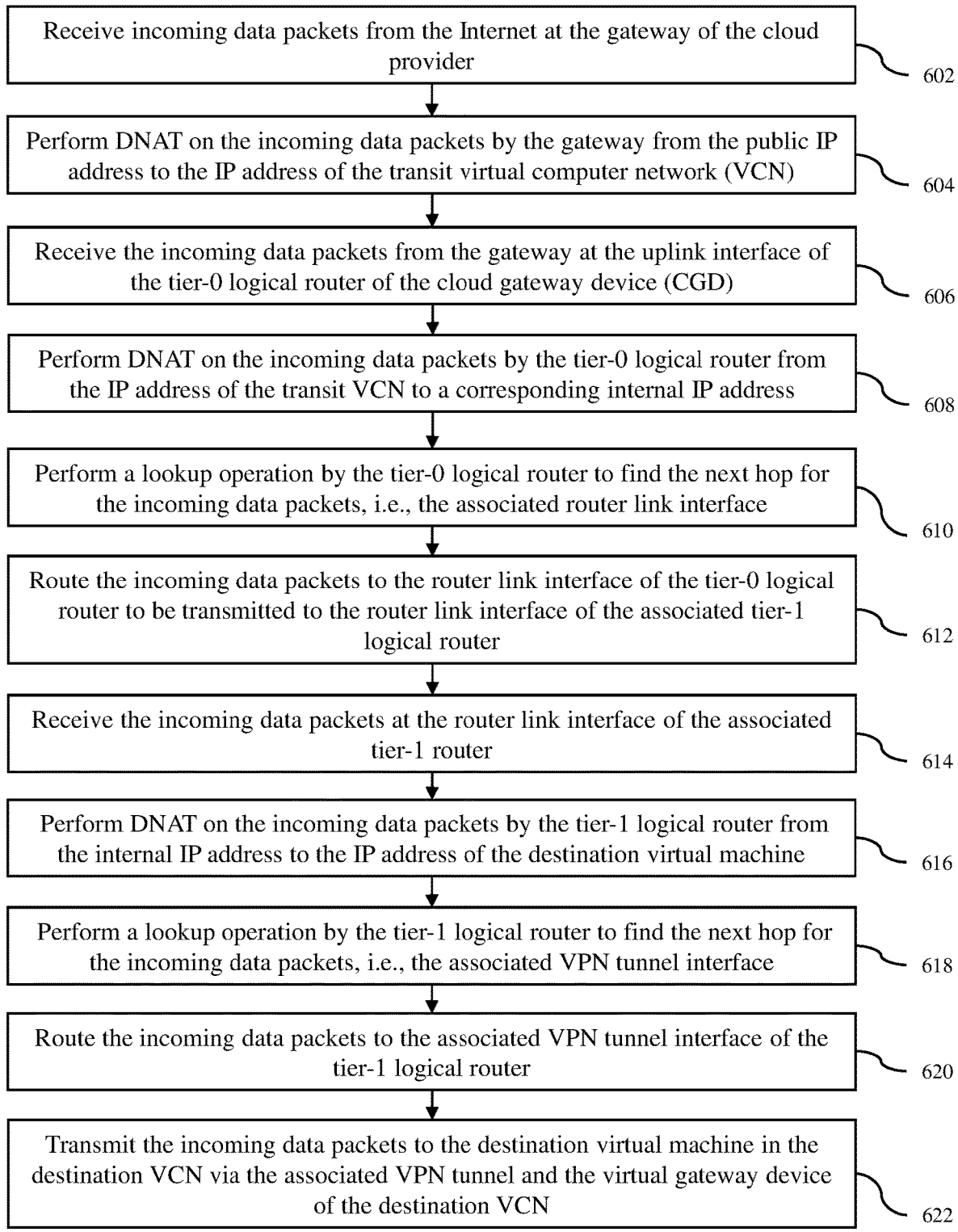
FIG. 6 is a process flow diagram of data traffic from the Internet to any component in any of the virtual computer networks using the transit virtual computer network in accordance with an embodiment of the invention.

The data traffic from the Internet 106 to any component in any of the virtual computer networks 140 using the transit virtual computer network 142 in accordance with an embodiment of the invention is described with references to a process flow diagram of FIG. 6 using the example shown in FIG. 4. In this description, it is assumed that the data traffic is from the Internet 106 to the virtual machine 402A with an IP address of 10.0.0.1 in the virtual computer network 140A.

At block 602, incoming data packets from the Internet 106 are received at the external gateway 344 of the cloud provider of the public cloud computing environment 104. Next, at block 604, destination network address translation (DNAT) is performed on the incoming data packets by the external gateway 344 from the elastic/public IP address to a corresponding IP address of the transit virtual computer network 142. In the example shown in FIG. 4, the destination IP address of the incoming data packets is translated from the elastic/public IP address to the IP address of 30.0.0.1 of the transit virtual computer network 142.

Next, at block 606, the incoming data packets from the external gateway 344 are received at the uplink interface of the tier-0 logical router 304 of the cloud gateway device 302 in the transit virtual computer network 142. Next, at block 608, DNAT is performed on the incoming data packets by the tier-0 router 304 from the IP address of the transit virtual computer network 142 to a corresponding internal IP address selected from the associated internal IP pool POOL-A for the virtual computer network 140A, which is the network where the destination virtual machine 402A resides. In the example shown in FIG. 4, the destination IP address of the incoming data packets is translated from the IP address of 30.0.0.1 of the transit virtual computer network 142 to the internal POOL-A IP address of 172.0.0.1.

Next, at block 610, a lookup operation is performed by the tier-0 logical router 304 to find the next hop for the incoming data packets. In the example shown in FIG. 4, the next hop is the router link interface LINK1 of the tier-0 logical router 304, as illustrated in the route table RT1 of the tier-0 logical router, which is associated with the virtual computer network 140A. Next, at block 612, the incoming data packets are routed to the router link interface LINK1 of the tier-0 logical router 304 to be transmitted to the router link interface LINK1 of the tier-1 logical router 306A, which is associated with the virtual computer network 140A.

Next, at block 614, the incoming data packets are received at the router link interface LINK1 of the tier-1 router 306A. Next, at block 616, DNAT is performed on the incoming data packets by the tier-1 logical router 306A on the router link interface LINK1 from the internal IP address to the IP address of the destination virtual machine 402A. In the example shown in FIG. 4, the destination IP address of the incoming data packets is translated from the internal IP address of 172.0.0.1 to the virtual machine IP address of 10.0.0.1.

Next, at block 618, a lookup operation is performed by the tier-1 logical router 306A to find the next hop for the incoming data packets. In the example shown in FIG. 4, the next hop for the incoming data packets on the router link interface LINK1 of the tier-1 logical router 306A is the VPN tunnel interface VTI1. Next, at block 620, the incoming data packets are routed to the VPN tunnel interface VTI1 of the tier-1 logical router 306A. Next, at block 622, the incoming data packets are transmitted to the destination virtual machine 402A in the destination virtual computer network 140A via the VPN tunnel VT1 and the virtual gateway device 234A of the destination virtual computer network 140A. In order to transmit the incoming data packets through the VPN tunnel VT1, the data packets are encapsulated at the VPN tunnel interface VTI1 of the tier-1 logical router 306A and decapsulated at the virtual gateway device 234A of the destination virtual computer network 140A.

Figure 7:
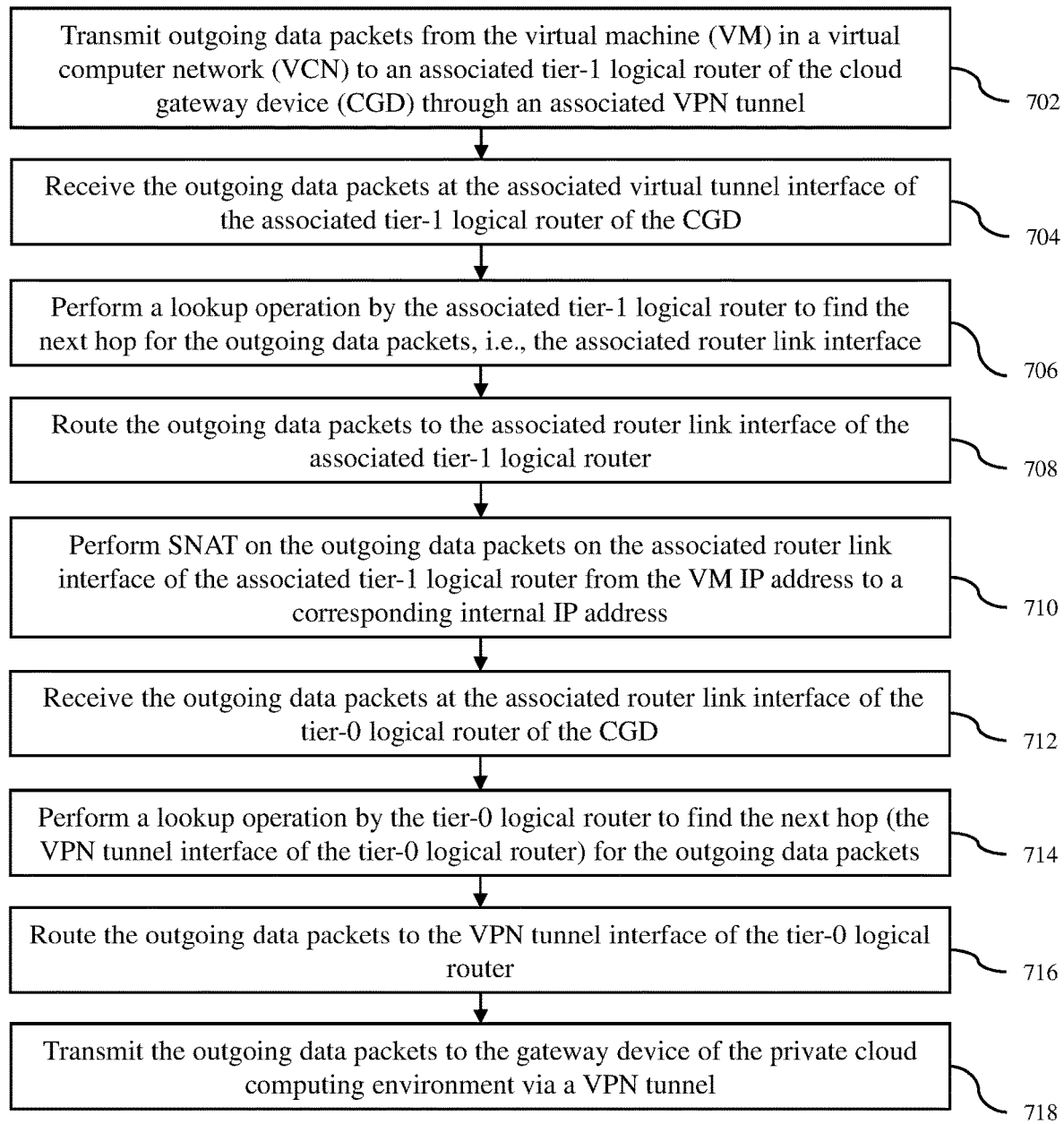
FIG. 7 is a process flow diagram of data traffic from any component in any of the virtual computer networks to a private cloud computing environment using the transit virtual computer network in accordance with an embodiment of the invention.

The data traffic from any component in any of the virtual computer networks 140 to the private cloud computing environment 102 using the transit virtual computer network 142 in accordance with an embodiment of the invention is described with references to a process flow diagram of FIG. 7 using the example shown in FIG. 4. In this description, it is assumed that the data traffic is from a virtual machine 402A with an IP address of 10.0.0.1 in the virtual computer network 140A.

Blocks 702-712 of the process flow diagram of FIG. 7 are same as blocks 502-512 of the process flow diagram of FIG. 5 to transmit outgoing data packets from the virtual machine 402A in the virtual computer network 140A to the associated router link interface LINK1 of the tier-0 logical router 304 of the cloud gateway device 302.

Next, at block 714, a lookup operation is performed by the tier-0 logical router 304 to find the next hop for the outgoing data, which in this case is the VPN tunnel interface VTI0 of the tier-0 logical router since the outgoing data packets are destined for the private cloud computing environment 102. Next, at block 716, the outgoing data packets are routed to the VPN tunnel interface VTI0 of the tier-0 logical router 304.

Next, at block 718, the outgoing data packets are transmitted to the gateway device 134 of the private cloud computing environment 102 via the VPN tunnel VT0 to be routed to the final destination in the private cloud computing environment. In order to transmit the outgoing data packets through the VPN tunnel VT0, the data packets are encapsulated at the VPN tunnel interface VTI0 of the tier-0 logical router 304 and decapsulated at the gateway device 134 of the private cloud computing environment 102.

Figure 8:
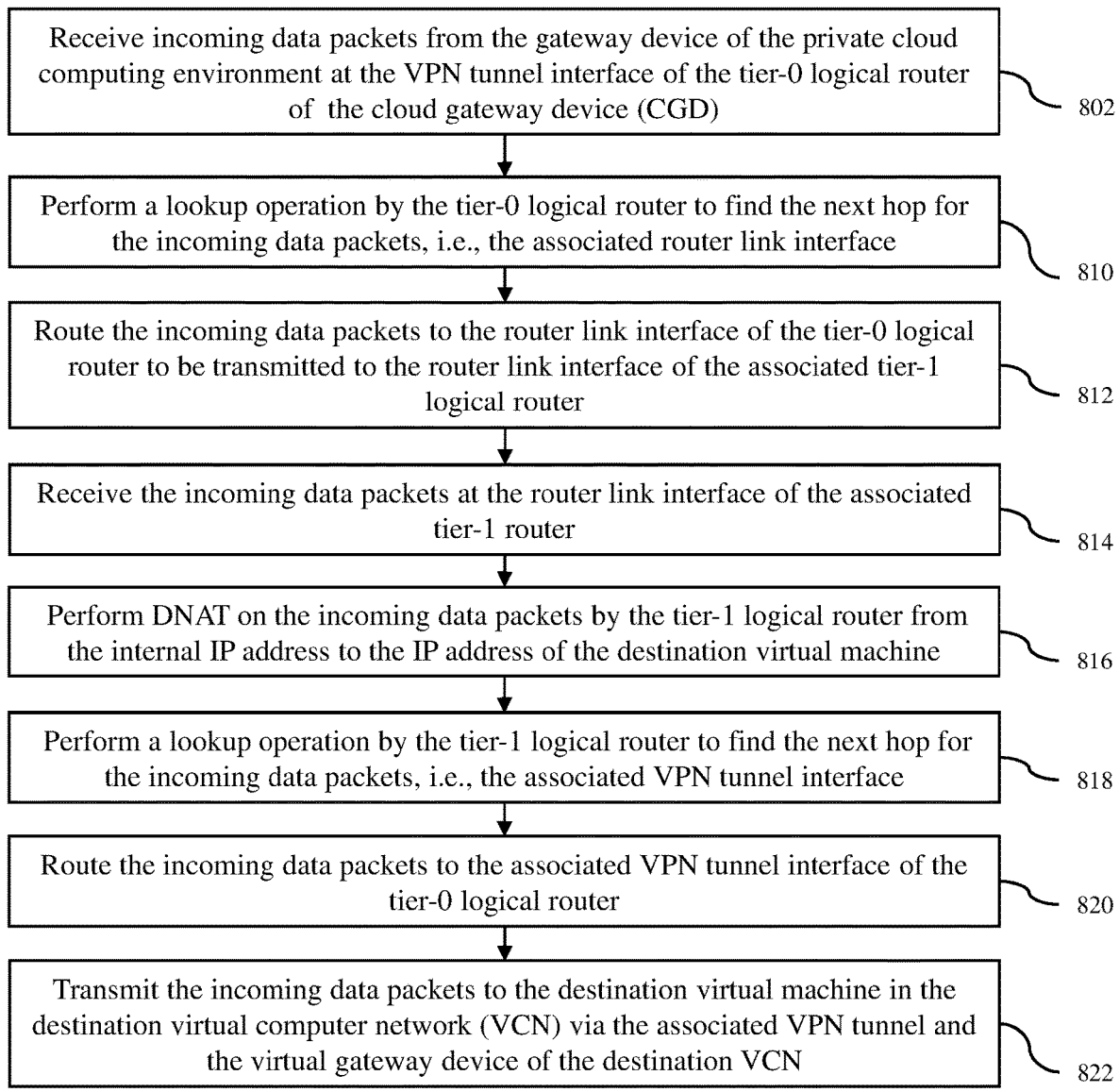
FIG. 8 is a process flow diagram of data traffic from a private cloud computing environment to any component in any of the virtual computer networks using the transit virtual computer network in accordance with an embodiment of the invention.

The data traffic from the private cloud computing environment 102 to any component in any of the virtual computer networks 140 using the transit virtual computer network 142 in accordance with an embodiment of the invention is described with references to a process flow diagram of FIG. 8 using the example shown in FIG. 4. In this description, it is assumed that the data traffic is from the private cloud computing environment 102 to the virtual machine 402A with an IP address of 10.0.0.1 in the virtual computer network 140A.

At first block 802, incoming data packets from the gateway device 134 of the private cloud computing environment 102 are received at the VPN tunnel interface VTI0 of the tier-0 router 304 of the cloud gateway device 302 via the VPN tunnel VT0. In order for the incoming data packets to travel through the VPN tunnel VT0, the data packets are encapsulated at the gateway device 134 of the private cloud computing environment 102 and decapsulated at the VPN tunnel interface VTI0 of the tier-0 router 304.

The following blocks 810-822 of the process flow diagram of FIG. 8 are same as blocks 610-622 of the process flow diagram of FIG. 6 to transmit the incoming data packets from the tier-0 router 304 of the cloud gateway device 302 to the virtual machine 402A in the virtual computer network 140A.

Figure 9:
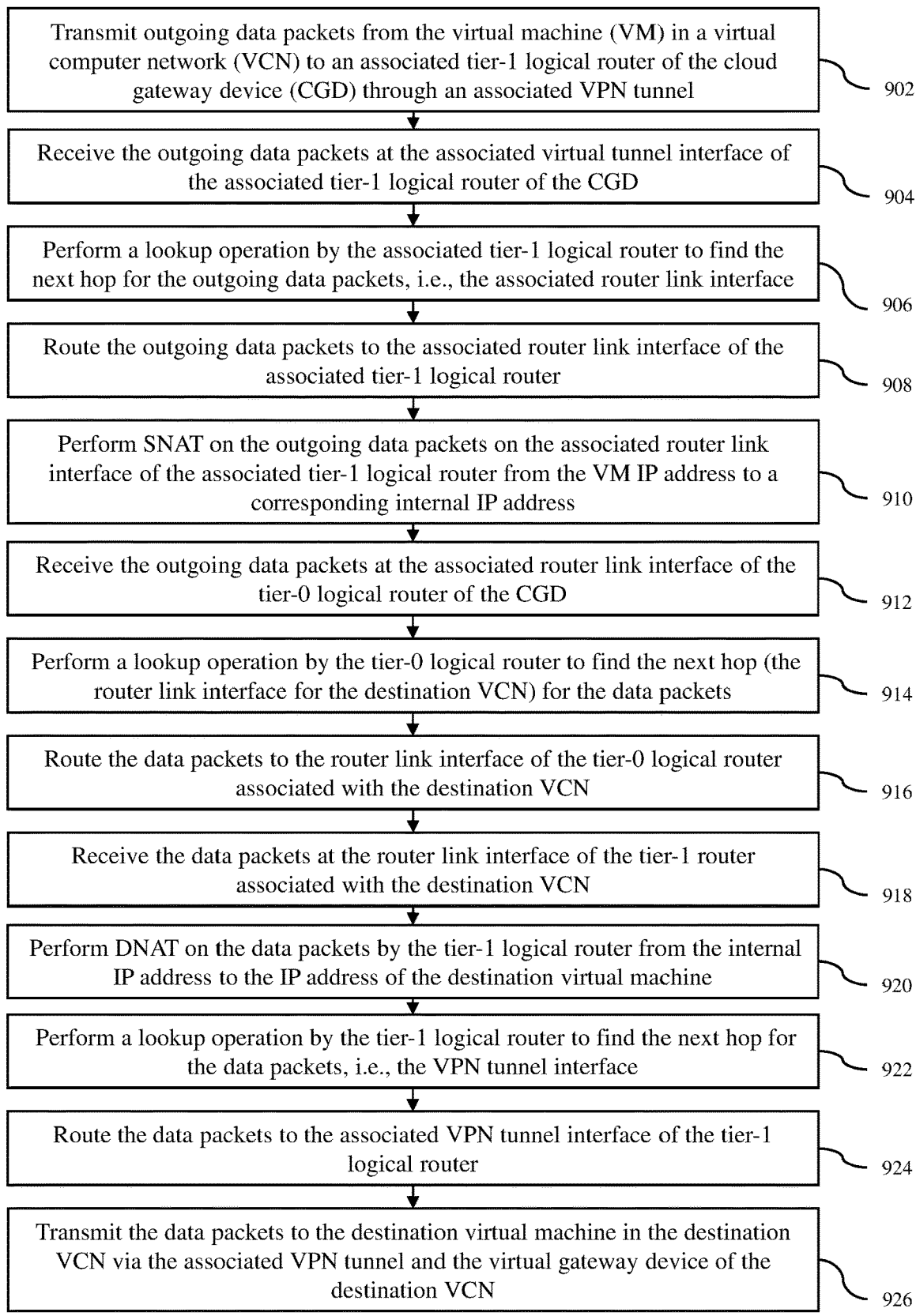
FIG. 9 is a process flow diagram of data traffic from any component in a first virtual computer network to any component in a second virtual computer network using the transit virtual computer network in accordance with an embodiment of the invention.

The data traffic from any component in any of the virtual computer networks 140 to any component in any of the other virtual computer networks 140 using the transit virtual computer network 142 in accordance with an embodiment of the invention is described with references to a process flow diagram of FIG. 9 using the example shown in FIG. 4. In this description, it is assumed that the data traffic is from the first virtual machine 402A with an IP address of 10.0.0.1 in the virtual computer network 140A to the second virtual machine 402B with the same IP address of 10.0.0.1 in the virtual computer network 140B. Thus, data packets from the first virtual machine 402A will have a source IP address of 10.0.0.1 and a destination IP address of 173.0.0.1. which is the internal IP address for the IP address of 10.0.0.1 for the second virtual machine 402B.

Blocks 902-912 of the process flow diagram of FIG. 9 are same as blocks 502-512 of the process flow diagram of FIG. 5 to transmit outgoing data packets from the virtual machine 402A in the virtual computer network 140A to the associated router link interface LINK1 of the tier-0 logical router 304 of the cloud gateway device 302. Thus, at the router link interface LINK1 of the tier-0 logical router 304, the source IP address of the outgoing data packets is 172.0.0.1 and the destination IP address of the outgoing data packets is still 173.0.0.1.

Next, at block 914, a lookup operation is performed by the tier-0 logical router to find the next hop for the data packets, which in this case is the router link interface LINK2 of the tier-0 logical router 304 associated with the virtual computer network 140B since the data packets are destined for the virtual computer network 140B. Next, at block 916, the data packets are routed to the router link interface LINK2 of the tier-0 logical router 304, which is associated with the destination virtual computer network 140B, to be transmitted to the corresponding router link interface LINK2 of the tier-1 logical router 306B.

Next, at block 918, the data packets are received at the router link interface LINK2 of the tier-1 router 306B. Next, at block 920, DNAT is performed on the data packets by the tier-1 logical router 306B on the router link interface LINK2 from the internal IP address to the IP address of the destination virtual machine 402B. In the example shown in FIG. 4, the destination IP address of the data packets is translated from the internal IP address of 173.0.0.1 to the virtual machine IP address of 10.0.0.1. The source IP address of the data packets at this point is still 172.0.01.

Next, at block 922, a lookup operation is performed by the tier-1 logical router 306B to find the next hop for the data packets. In the example shown in FIG. 4, the next hop for the data packets on the router link interface LINK2 of the tier-1 logical router 306B is the VPN tunnel interface VTI2. Next, at block 924, the data packets are routed to the VPN tunnel interface VTI2 of the tier-1 logical router 306B. Next, at block 926, the data packets are transmitted to the destination virtual machine 402B in the destination virtual computer network 140B via the VPN tunnel VT2 and the virtual gateway device 234B of the destination virtual computer network 140B. In order to transmit the data packets through the VPN tunnel VT2, the data packets are encapsulated at the VPN tunnel interface VTI2 of the tier-1 logical router 306B and decapsulated at the virtual gateway device 234B of the destination virtual computer network 140B.

For high availability (HA), a pair of cloud gateway devices 302 may be deployed in the public cloud computing environment 104 with one in active state and another in standby state. In the case of active cloud gateway device failover, the tier-0 and tier-1 logical routers are failed over to the standby cloud gateway device. The IPSEC VPN tunnels are re-established with the virtual gateway devices 234 of the virtual computer networks 140 and the gateway device 134 of the private cloud computing environment 102. In addition, internal pools on the tier-1 logical routers of the failed cloud gateway device with NAT rules are failed over to the standby cloud gateway device and elastic/public IP address the uplink interface of the tier-0 logical router are moved to the standby cloud gateway device. This HA is hitless in nature, which means that existing transmission control protocol (TCP) session will continue to work in the event of failover.

The use of the cloud gateway device 302 in the transit virtual computer network 142 to connect multiple virtual computer networks, which may be VPCs or VNETs, allows virtual computer network aware edge firewall on the cloud gateway device. Since each virtual computer network is represented via a tier-1 logical router in the cloud gateway device 302, an administrator can apply firewall polices at the virtual computer network level using edge firewall rules on individual tier-1 logical routers in the cloud gateway device. Thus, different sets of firewall policies can be applied to same overlapping IP addresses across different virtual computer networks connected to the cloud gateway device 302. For example, an administrator can choose to allow certain traffic for the IP address X of a first virtual computer network and block the same for the IP address X of a second virtual computer network.

Figure 10:
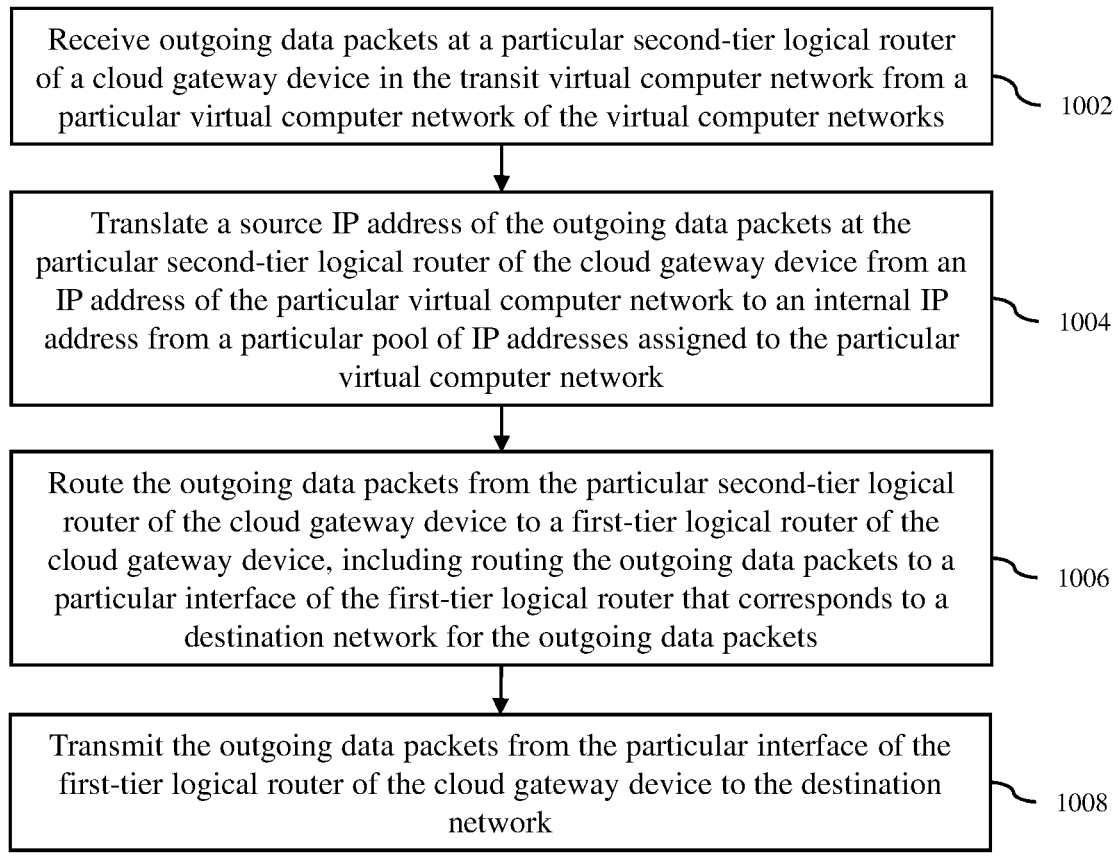
FIG. 10 is a flow diagram of a computer-implemented method for connecting virtual computer networks in a public cloud computing environment using a transit virtual computer network in accordance with an embodiment of the invention.

A computer-implemented method for connecting virtual computer networks in a public cloud computing environment using a transit virtual computer in accordance with an embodiment of the invention is described with reference to a flow diagram of FIG. 10. At block 1002, outgoing data packets are received at a particular second-tier logical router of a cloud gateway device in the transit virtual computer network from a particular virtual computer network of the virtual computer networks. The particular second-tier logical router is a second-tier logical router from a plurality of second-tier logical routers in the cloud gateway device that is exclusively connected to the particular virtual computer network. At block 1004, a source IP address of the outgoing data packets is translated at the particular second-tier logical router of the cloud gateway device from an IP address of the particular virtual computer network to an internal IP address from a particular pool of IP addresses assigned to the particular virtual computer network. The particular pool of IP addresses is a pool of IP addresses from a plurality of pools of IP addresses used in the cloud gateway device that is exclusively assigned to the particular virtual computer network. At block 1006, the outgoing data packets are routed from the particular second-tier logical router of the cloud gateway device to a first-tier logical router of the cloud gateway device, including routing the outgoing data packets to a particular interface of the first-tier logical router that corresponds to a destination network for the outgoing data packets. At block 1008, the outgoing data packets are transmitted from the particular interface of the first-tier logical router of the cloud gateway device to the destination network.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for connecting virtual computer networks in a public cloud computing environment using a transit virtual computer network, the method comprising:
receiving outgoing data packets at a particular second-tier logical router of a cloud gateway device in the transit virtual computer network from a particular virtual computer network of the virtual computer networks that are connected to the cloud gateway device, wherein the particular virtual computer network is a virtual private cloud in the public cloud computing environment, the particular second-tier logical router being a second-tier logical router from a plurality of second-tier logical routers in the cloud gateway device, wherein the particular second-tier logical router is exclusively connected to the particular virtual computer network;
translating a source IP address of the outgoing data packets at the particular second-tier logical router of the cloud gateway device from an IP address of the particular virtual computer network to an internal IP address from a particular pool of IP addresses assigned to the particular virtual computer network, the particular pool of IP addresses being a pool of IP addresses from a plurality of pools of IP addresses used in the cloud gateway device, wherein the particular pool of IP addresses is exclusively assigned to the particular virtual computer network and does not overlap with other pools of IP addresses of the plurality of pools of IP addresses;
routing the outgoing data packets from the particular second-tier logical router of the cloud gateway device to a first-tier logical router of the cloud gateway device, including routing the outgoing data packets to a particular interface of the first-tier logical router that corresponds to a destination network for the outgoing data packets; and
transmitting the outgoing data packets from the particular interface of the first-tier logical router of the cloud gateway device to the destination network,
wherein the destination network is a private cloud computing environment and the particular interface is a virtual private network (VPN) tunnel interface, and wherein transmitting the outgoing data packets from the first-tier logical router of the cloud gateway device to the destination network includes transmitting the outgoing data packets from the VPN tunnel interface of the first-tier logical router of the cloud gateway device to the private cloud computing environment through a VPN tunnel.

2. The method of claim 1, further comprising:
routing additional outgoing data packets from the particular second-tier logical router of the cloud gateway device to the first-tier logical router of the cloud gateway device, including routing the outgoing data packets to an uplink interface of the first-tier logical router that corresponds to the Internet for the additional outgoing data packets;
translating the source IP address of the additional outgoing data packets at the first-tier logical router of the cloud gateway device from the internal IP address to an IP address of the transit virtual computer network prior to the outgoing data packets being transmitted to the Internet; and
after the translating, transmitting the additional outgoing data packets from the uplink interface of the first-tier logical router of the cloud gateway device to the Internet.

3. The method of claim 2, wherein transmitting the additional outgoing data packets from the uplink interface of the first-tier logical router of the cloud gateway device to the Internet includes transmitting the additional outgoing data packets from the uplink interface of the first-tier logical router of the cloud gateway device to the Internet via a gateway in the public cloud computing environment that is external to the transit virtual computer network, where the source IP address of the additional outgoing data packets is translated from the IP address of the transit virtual computer network to an elastic IP address.

4. The method of claim 1, further comprising:
routing additional outgoing data packets from the particular second-tier logical router of the cloud gateway device to the first-tier logical router of the cloud gateway device, including routing the outgoing data packets to a router link interface of the first-tier logical router for another virtual computer network of the virtual computer networks;
transmitting the additional outgoing data packets from the first-tier logical router of the cloud gateway device to another second-tier logical router of the cloud gateway device that is connected to the another virtual computer network; and transmitting the additional outgoing data packets from the another second-tier logical router of the cloud gateway device to the another virtual computer network.

5. The method of claim 1, wherein receiving the outgoing data packets at the particular second-tier logical router of the cloud gateway device includes receiving the outgoing data packets at the virtual private network (VPN) tunnel interface of the particular second-tier logical router of the cloud gateway device from the particular virtual computer network via an Internet Protocol Security (IPSEC) VPN tunnel.

6. The method of claim 5, further comprising routing the outgoing data packets from the VPN tunnel interface of the particular second-tier logical router of the cloud gateway device to a router link interface of the particular second-tier logical router that connects to the first-tier logical router of the cloud gateway device.

7. The method of claim 1, wherein the particular virtual computer network has IP addresses that overlap with IP addresses of another virtual computer network in the public cloud computing environment connected to the transit virtual computer network.

8. The method of claim 1, further comprising:
receiving incoming data packets at the first-tier logical router of the cloud gateway device;
routing the incoming data packets from the first-tier logical router to the particular second-tier logical router of the cloud gateway device;
translating a destination IP address of the incoming data packets at the particular second-tier logical router from the internal IP address to the IP address of the particular virtual computer network; and
transmitting the incoming data packets from the particular second-tier logical router of the cloud gateway device to the particular virtual computer network.

9. The method of claim 1, further comprising creating a new second-tier router in the cloud gateway device of the transit virtual computer network when a new virtual computer network in the public cloud computing environment is connected to the cloud gateway device.

10. A non-transitory computer-readable storage medium containing program instructions for method for connecting virtual computer networks in a public cloud computing environment using a transit virtual computer network, wherein execution of the program instructions by one or more processors of a computer system causes the one or more processors to perform steps comprising:
receiving outgoing data packets at a particular second-tier logical router of a cloud gateway device in the transit virtual computer network from a particular virtual computer network of the virtual computer networks that are connected to the cloud gateway device, wherein the particular virtual computer network is a virtual private cloud in the public cloud computing environment, the particular second-tier logical router being a second-tier logical router from a plurality of second-tier logical routers in the cloud gateway device, wherein the particular second-tier logical router is exclusively connected to the particular virtual computer network;
translating a source IP address of the outgoing data packets at the particular second-tier logical router of the cloud gateway device from an IP address of the particular virtual computer network to an internal IP address from a particular pool of IP addresses assigned to the particular virtual computer network, the particular pool of IP addresses being a pool of IP addresses from a plurality of pools of IP addresses used in the cloud gateway device, wherein the particular pool of IP addresses is exclusively assigned to the particular virtual computer network and does not overlap with other pools of IP addresses of the plurality of pools of IP addresses;
routing the outgoing data packets from the particular second-tier logical router of the cloud gateway device to a first-tier logical router of the cloud gateway device, including routing the outgoing data packets to a particular interface of the first-tier logical router that corresponds to a destination network for the outgoing data packets; and
transmitting the outgoing data packets from the particular interface of the first-tier logical router of the cloud gateway device to the destination network,
wherein the destination network is a private cloud computing environment and the particular interface is a virtual private network (VPN) tunnel interface, and wherein transmitting the outgoing data packets from the first-tier logical router of the cloud gateway device to the destination network includes transmitting the outgoing data packets from the VPN tunnel interface of the first-tier logical router of the cloud gateway device to the private cloud computing environment through a VPN tunnel.

11. The non-transitory computer-readable storage medium of claim 10, wherein the steps further comprise:
routing additional outgoing data packets from the particular second-tier logical router of the cloud gateway device to the first-tier logical router of the cloud gateway device, including routing the outgoing data packets to an uplink interface of the first-tier logical router that corresponds to the Internet for the additional outgoing data packets;
translating the source IP address of the additional outgoing data packets at the first-tier logical router of the cloud gateway device from the internal IP address to an IP address of the transit virtual computer network prior to the outgoing data packets being transmitted to the Internet; and
after the translating, transmitting the additional outgoing data packets from the uplink interface of the first-tier logical router of the cloud gateway device to the Internet.

12. The non-transitory computer-readable storage medium of claim 11, wherein transmitting the additional outgoing data packets from the uplink interface of the first-tier logical router of the cloud gateway device to the Internet includes transmitting the additional outgoing data packets from the uplink interface of the first-tier logical router of the cloud gateway device to the Internet via a gateway in the public cloud computing environment that is external to the transit virtual computer network, where the source IP address of the additional outgoing data packets is translated from the IP address of the transit virtual computer network to an elastic IP address.

13. The non-transitory computer-readable storage medium of claim 10, wherein the steps further comprise:
routing additional outgoing data packets from the particular second-tier logical router of the cloud gateway device to the first-tier logical router of the cloud gateway device, including routing the outgoing data packets to a router link interface of the first-tier logical router for another virtual computer network of the virtual computer networks;
transmitting the additional outgoing data packets from the first-tier logical router of the cloud gateway device to another second-tier logical router of the cloud gateway device that is connected to the another virtual computer network; and transmitting the additional outgoing data packets from the another second-tier logical router of the cloud gateway device to the another virtual computer network.

14. The non-transitory computer-readable storage medium of claim 10, wherein receiving the outgoing data packets at the particular second-tier logical router of the cloud gateway device includes receiving the outgoing data packets at the virtual private network (VPN) tunnel interface of the particular second-tier logical router of the cloud gateway device from the particular virtual computer network via an Internet Protocol Security (IPSEC) VPN tunnel.

15. The non-transitory computer-readable storage medium of claim 14, further comprising routing the outgoing data packets from the VPN tunnel interface of the particular second-tier logical router of the cloud gateway device to a router link interface of the particular second-tier logical router that connects to the first-tier logical router of the cloud gateway device.

16. The non-transitory computer-readable storage medium of claim 10, wherein the particular virtual computer network has IP addresses that overlap with IP addresses of another virtual computer network in the public cloud computing environment connected to the transit virtual computer network.

17. The non-transitory computer-readable storage medium of claim 10, wherein the steps further comprise:
receiving incoming data packets at the first-tier logical router of the cloud gateway device;
routing the incoming data packets from the first-tier logical router to the particular second-tier logical router of the cloud gateway device;
translating a destination IP address of the incoming data packets at the particular second-tier logical router from the internal IP address to the IP address of the particular virtual computer network; and
transmitting the incoming data packets from the particular second-tier logical router of the cloud gateway device to the particular virtual computer network.

18. The non-transitory computer-readable storage medium of claim 10, wherein the steps further comprise creating a new second-tier router in the cloud gateway device of the transit virtual computer network when a new virtual computer network in the public cloud computing environment is connected to the cloud gateway device.

19. A system comprising:
memory; and
at least one processor configured to:
receive outgoing data packets at a particular second-tier logical router of a cloud gateway device in a transit virtual computer network from a particular virtual computer network of virtual computer networks that are connected to the cloud gateway device of the transit virtual computer network in a public cloud computing environment, wherein the particular virtual computer network is a virtual private cloud in the public cloud computing environment, the particular second-tier logical router being a second-tier logical router from a plurality of second-tier logical routers in the cloud gateway device, wherein the particular second-tier logical router is exclusively connected to the particular virtual computer network;

translate a source IP address of the outgoing data packets at the particular second-tier logical router of the cloud gateway device from an IP address of the particular virtual computer network to an internal IP address from a particular pool of IP addresses assigned to the particular virtual computer network, the particular pool of IP addresses being a pool of IP addresses from a plurality of pools of IP addresses used in the cloud gateway device, wherein the particular pool of IP addresses is exclusively assigned to the particular virtual computer network and does not overlap with other pools of IP addresses of the plurality of pools of IP addresses;

route the outgoing data packets from the particular second-tier logical router of the cloud gateway device to a first-tier logical router of the cloud gateway device, including routing the outgoing data packets to a particular interface of the first-tier logical router that corresponds to a destination network for the outgoing data packets; and transmit the outgoing data packets from the particular interface of the first-tier logical router of the cloud gateway device to the destination network, wherein the destination network is a private cloud computing environment and the particular interface is a virtual private network (VPN) tunnel interface, and wherein the at least one processor is configured to transmit the outgoing data packets from the VPN tunnel interface of the first-tier logical router of the cloud gateway device to the private cloud computing environment through a VPN tunnel.

20. The system of claim 19, wherein the at least one processor is configured to receive the outgoing data packets at the virtual private network (VPN) tunnel interface of the particular second-tier logical router of the cloud gateway device from the particular virtual computer network via an Internet Protocol Security (IPSEC) VPN tunnel.

* * * * *